United States Patent [19]

Minkema et al.

[11] 4,172,736

[45] Oct. 30, 1979

[54] THICKENER FOR REACTIVE DYES

[75] Inventors: William H. Minkema, Maple Plain; Gerald J. Shelso, Brooklyn Center, both of Minn.

[73] Assignee: Henkel Corporation, Minneapolis, Minn.

[21] Appl. No.: 878,624

[22] Filed: Feb. 17, 1978

[51] Int. Cl.$^2$ ............................................. C09D 11/00
[52] U.S. Cl. ............................................ 106/22; 8/62; 8/63; 106/19; 106/25; 106/30; 536/44
[58] Field of Search ................... 106/19, 22, 23, 25, 106/30; 8/62, 63; 544/326; 536/144

[56] References Cited

U.S. PATENT DOCUMENTS 2,202,066  5/1940  Platt .................................. 106/22

Primary Examiner—J. Ziegler
Attorney, Agent, or Firm—Patrick J. Span; Forrest L. Collins

[57] ABSTRACT

Thickening of "cellulose reactive dyes" with carboxyethyl guar.

3 Claims, No Drawings

THICKENER FOR REACTIVE DYES

This invention relates to thickening "cellulose reactive dyes." More particularly, this invention relates to thickening with carboxyethyl guar dyes which react with cellulose fibers.

BACKGROUND OF THE INVENTION

"Reactive dyes" are colored compounds which have suitable groups capable of forming covalent bonds between a carbon atom of the dye ion or molecule and an oxygen, nitrogen or sulphur atom of a hydroxy, an amino or a mercapto group, respectively, of the substrate. "Cellulose reactive dyes" are based on a discovery made in 1954 by Rattee and Stephen, who claimed that, by applying water-soluble dyes containing a dichlorotriazine group to cellulose from a neutral dyebath and then increasing the pH value, covalent bonds were formed between a triazine carbon atom and an oxygen atom of a cellulose hydroxyl group. It was later found that monochloro triazine dyes also could be used as reactive dyes for cotton when the dyeing temperature and the pH value of the dyebath for the second part of the batch dyeing operation were increased. Since the original "cellulose reactive dyes" were discovered, other reactive groups have been discovered.

A typical "cellulose reactive dye" has the symbolic formula:

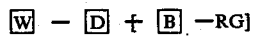

wherein RG is the reactive group, B is a bridge link, D is the chromagen, and W is a water solubilizing group. It is believed that the "cellulose reactive dyes" react strongly with primary hydroxyl groups of polymeric polysaccharides such as cellulose. Generally the reactive group is a halide radical and the by-product of the reaction is a hydrogen halide. Other reactive groups such as sulphuric acid ester groups of $\beta$-hydroxyethylsulphone are also known. "B" shown above as a bridge link is found in many dyes but not in others and is therefore an optional link. In dyes where there is no bridge link, the reactive group is attached directly to the chromophoric system.

Illustrative of a specific "cellulose reactive dye" is a dye from the dichlorotriazine group having the formula:

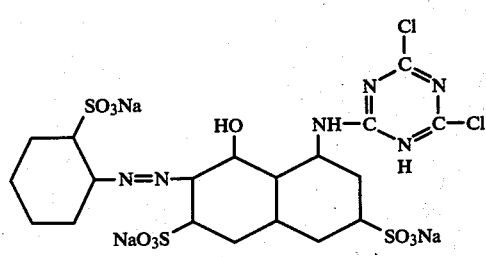

The chloride radicals are the reactive groups RB. The triazine molecule is the bridge link. The —SO$_3$Na group is the water solubilizing group. The remainder of the molecule is the chromagen.

Below are shown a typical list of reactive and binder groups used in "cellulose reactive dyes":
di- or mono-chlorotriazines
2,4,5 trihalogenopyrimidine
2-methylsulphonyl-4-methyl-5-chloropyrimidine
3,6-dichloropyrazine
2,3-dichloroquinoxaline
2-chlorobenzthiazole
4,5-dichloropyridazone Dyes such as these react with textiles including cotton, wool, silk and nylon. The printing of textiles requires the dye solution to be thickened to produce good printing characteristics. After the textile is printed, the dye is set onto the fabric and the thickener is washed out of the fabric. Traditionally, "cellulose reactive dyes" are thickened with sodium alginate.

Sodium alginate does not have any primary hydroxyl groups with which the dye can react. Galactomannan and cellulose derivatives have primary hydroxyl groups with which the "cellulose reactive dyes" react. Because the dyes react with galactomannan and cellulose derivatives, these materials cannot be used as thickeners for this type of dye. The reaction between the thickener and the dye impairs the washing of the thickener from the textile. If the thickener is not washed out of the fabric, the fabric will be stiff or have a "harsh hand."

SUMMARY OF THE INVENTION

It has now been found that "cellulose reactive dyes" can be thickened with a carboxyethyl guar having a molar ratio of from about 0.7 to 1.5. This result is unexpected inasmuch as carboxyethyl guar contains primary hydroxyl groups. It is further unexpected inasmuch as the same result was not obtained with carboxymethyl guar containing primary hydroxyl groups.

Generally, the carboxyethyl guar is used in an amount of about 1.0% to 1.5% based upon the weight of print paste. Optimum results are obtained when mixtures of sodium alginate and carboxyethyl guar are used. Preferably such mixtures contain about 20% to 80% by weight carboxyethyl guar and 80% ti 20% by weight sodium alginate based upon the total weight of the mixture of thickeners.

DETAILS OF THE INVENTION

The carboxyethyl ethers may be formed by treating guar gum with a cold aqueous solution of an alkali such as sodium hydroxide and then treating the alkali gum with acrylonitrile. This reaction mixture is then heated to a temperature of 80°–95° C. for an appreciable period of time, 1 to 2 hours, with efficient mixing, hydrolyzing the acylonitrile adduct to carbamylethyl and carboxyethyl guar. The reaction mixture is then cooled and then dried and ground.

Dyes useful in the practice of this invention are discussed above. The dyeing process, when dyes of this type are used, is conducted under alkaline condition to provide for the neutralization of the hydrogen halogen or any other acid molecule released by the reaction of the dye with the fabric. Sodium bicarbonate is usually included in the dye formulation in amounts of about 1% to 5% by weight based on the total weight of the formulation to accomplish the neutralization. Preferably sodium m-nitrobenzene sulfonate in an amount of from about 0.5% to 4% by weight based on the total weight of the formulation is included in the formulation. Sodium m-nitrobenzene sulfonate inhibits oxidation and promotes stability of the dye. Urea in the amounts of 10% to 20% by weight based on the total weight of the formulation can be included to aid solubility of the dye.

A variety of steps can be used in the dyeing process. Typical processes are:

(1) Print-dye-steam-wash
(2) Print-dry-bake-wash
(3) Print-dry-cold alkali solution-flash-age-wash
(4) Print-dry-hot alkali solution-wash.

In general a thickener solution, a dye solution and any of the optional ingredients are combined to produce a print paste having a given viscosity and pH. This paste is printed onto the fabric. The thickener holds the dye in a sheath around the fabric fiber until the dye can penetrate and react with the fiber. The thickener is then washed out of the fiber.

Shown below are specific examples of "cellulose reactive dyes" thickened with carboxyethyl guar. These examples are presented to illustrate the invention and are not intended to limit the scope of the invention.

EXAMPLE I

The following dyes were tested:

Dye I: (structure shown) — sold under the tradename Drimarene Z by Sandoz Colors and Chemicals Dye II: (structure shown) — sold under the tradename Drimarene R by Sandoz Colors and Chemicals Dye III: (structure shown) — sold under the tradename Levafix P by Bayer Chemical-Verona Dyestuff Dye IV: (structure shown) — sold under the tradename Levafix E by Bayer Chemical-Verona Dyestuff wherein
D is a chromagen group.

Print pastes were prepared by combining the following constituents:

|  | Parts By Weight | | |
| --- | --- | --- | --- |
|  | Dye I | Dye II | Dye III |
|  | 4 | 4 | 4 |
| Sodium m-nitrobenzene sulfonate | 1 | 1 | 1 |
| Urea | 20 | 20 | 15 |
| Water | 75 | 75 | 80 |

To 100 parts of the above mixture were added carboxyethyl guar in an amount of 1.4% by weight based upon the weight of the printing paste. The final viscosity of the thickened paste was about 3,000 centipoise as measured by a Brookfield Viscometer equipped with a #4 spindle and operated at 20 rpm at a temperature of 25° C.

Two parts by weight sodium carbonate was then dissolved in the Drimarene Z dyes. In the Drimarene R dyes, 0.8 parts by weight of sodium bicarbonate were dissolved and 2 parts by weight in the Levafix dyes.

The paste samples were then printed onto bleached cotton print cloth (test fabric Style #400) through a screen having 0.00916 $m^2$ opening in 200 mesh. The throughput of the screen was about 130–160 g. paste/$m^2$ of fabric.

The test samples were dried for a period of about one-half hour at a temperature of 60° C. in a forced-draft oven. The dyes were then fixed by heating the samples for a period of five minutes at a temperature of 160°–166° C. in a forced draft oven.

The procedure used for washing the thickener out of the samples was as follows. Each sample was rinsed by hand in a 3 qt. saucepan with running tap water at room temperature. The saucepan was filled to the 10-cup mark with water and 6 swatches of fabric and 1.25 ml of detergent Duponol FAB. The saucepan was then placed on a cold hotplate. The hotplate was a Chromalox 120 v, 1200 w, and 7" in diameter. The hotplate was turned on high and, when the temperature of the suspension in the saucepan reached between 95°–97° C., the hotplate was turned to medium. Timing from the point at which the mixture began to boil, the mixture was stirred every 5 minutes for 30 seconds over a period of 15 minutes. The saucepan was then removed from the hotplate and the suspension was stirred vigorously for 30 seconds. Water at room temperature was then run into the suspension and the swatches were squeezed and re-rinsed for at least 2 minutes. The swatches were then dried at 60° C. in a forced draft oven. They were then ironed to remove wrinkles.

The washout was then tested and graded. The printed and the non-printed areas of the swatches were gently bent between the fingers and an evaluation based upon hand feel was made. A grade of excellent was given to those swatches in which there was no observable difference in the hand feel between the printed and the un-printed portion of the swatches. The grading progressed downward through "good," "fair," and "poor." "Poor" was equivalent to the washout obtained from underivatized guar.

| Results | |
|---|---|
| Drimarene Z Dyes | Approximate Washout |
| Yellow Z-5GL | Excellent |
| Turquoise Z-G | Good to Fair |
| Black Z-BL | Good to Fair |
| Red Z-2BL | Fair |
| Drimarene R Dyes | |
| Red R-4BL | Fair |
| Brilliant Blue R-RGL | Good to Fair |
| Black R-2BL | Fair |
| Scarlet R-3G | Good |
| Turquoise R-2B | Poor[1] |
| Levafix P Dyes | |
| Blue PRA | Fair |
| Brilliant Red PB | Good to Fair |
| Brilliant Orange PGR | Good |
| Golden Yellow PR | Poor[2] |
| Black PR | Poor[3] |
| Levafix E Dyes | |
| Brilliant Blue | Poor[4] |

[1] gelling occurred
[2] precipitation occurred
[3] poor washout
[4] poor washout All of these observations are believed to be attributed to the chromagen radical reacting with the thickener.

The embodiments of the invention in which an exclusive property or privilege is claimed are defined as follows:

1. A printing paste comprising an aqueous solution of a "cellulose reactive dye" and carboxyethyl guar in an amount of about 1.0 to 1.5% by weight based upon the weight of the paste.

2. The printing paste of claim 1 wherein the "cellulose reactive dye" contains a halide reactive group.

3. The printing paste of claim 1 wherein the "cellulose reactive dye" has the formula

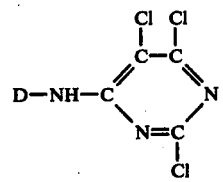

wherein
D is a chromagen radical.

* * * * *